E. De F. SHELTON.

Paper-Box.

No. 6,680. Reissued Oct. 5, 1875.

Witnesses.

Geo. T. Smallwood Jr.

John Robey Jr.

Inventor

Edward De F. Shelton.

By John J. Halsted his Atty

UNITED STATES PATENT OFFICE

EDWARD DE F. SHELTON, OF BIRMINGHAM, CONNECTICUT.

IMPROVEMENT IN PAPER BOXES.

Specification forming part of Letters Patent No. 158,134, dated December 22, 1874; reissue No. 6,680, dated October 5, 1875; application filed August 18, 1875.

*To all whom it may concern:*

Be it known that I, EDWARD DE F. SHELTON, of Birmingham, in the county of New Haven and State of Connecticut, have invented a new Paper Box, and a new method of forming the bottoms of paper boxes; and I do hereby declare the following, when taken in connection with the accompanying drawings and the letters of reference marked thereon, to be a full, clear, and exact description of the same, and which said drawings constitute part of this specification, and represent, in—

Figure 1:
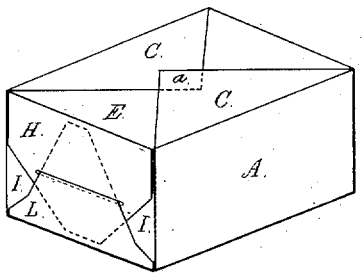
Figure 2:
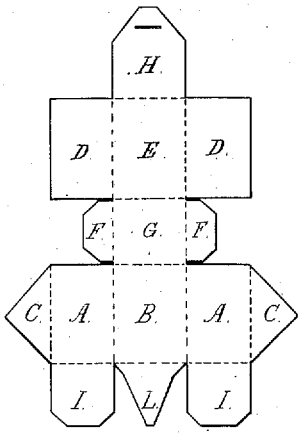
Figure 3:
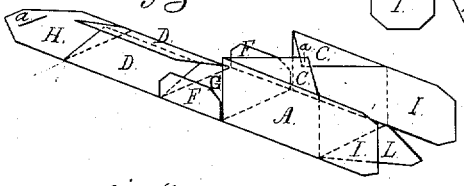
Figure 4:
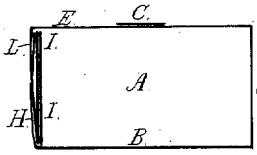
Figure 5:
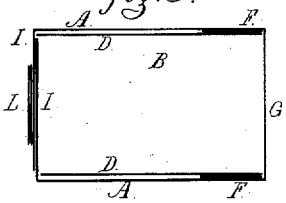

Figure 1, a perspective view of a box illustrating my method; Fig. 2, a diagram of the blank from which the block is formed; Fig. 3, a perspective view, illustrating the method of folding the blank; Fig. 4, a vertical longitudinal central section, and Fig. 5 a horizontal longitudinal central section of Fig. 1.

My invention consists in a new method of forming the bottom of paper boxes, which are made from a single piece of paper, such bottom having no tuck or fold exposed to the inside of the box, and every angle made secure and tight by drawing upward through the box the strip of which the bottom is an integral part, spreading the flaps of said strip, and, by so doing, covering all tucks, adjusting the bottom to place, and locking the bottom securely by bending the end of the strip across the top of the box, and forming with such end a part of a tuck; and it also consists in a new paper box, having, with other features, the above-named characteristics.

The blank is first cut from suitable paper or material, as in Fig. 2, the dotted lines denoting the lines of fold or bend. The two sides A A are turned up and their extremes brought together and secured, as at *a*, Fig. 3. The intermediate portion B forms one side, the two parts A A two other sides, and the parts C C unite upon the fourth side. Next, the flaps D D are turned nearly over upon the intermediate strip E, as seen in Fig. 3; then the parts F F are turned up so as to pass within the two sides A A; then the flaps D D and strip E are turned toward and passed in under the side C, and between the sides A A, until the parts F have fully entered within the sides A, so that the part G shall close that end of the case, the part E completing the fourth side underneath the parts C. The flaps D are then turned back against the sides A, thus covering completely the parts F, and adjusting and holding the bottom to its true position, the end H protruding at the other or open end of the box. Then the flaps I I are turned inward to close that open end, and the ends H and L turned down upon the flaps I, and the tip of the end L passed under through a slot, *a*, in the end H, as seen in Fig. 4.

This method of cutting and folding the blank produces a strong and durable case, with all the angles securely closed, and with but a single exposed tuck, viz., at the top, there being none at the bottom, and, consequently, no possibility of the bottom slipping or being forced out, as it is absolutely locked in securely by reason of its being continuous with the inner lining E, side flaps D D, and the closed tucking end H.

I do not broadly claim a box made complete from one piece of material by several folds, as such, I am aware, is very old; but

I claim as my invention—

1. In a paper box made from a single piece of paper, the described method of forming its bottom without a tuck or fold exposed to the inside of the box, and each of its angles made secure and tight by drawing upward through the box the strip of which the bottom is an integral part, and spreading the flaps of said strip, and, by so doing, covering all tucks and adjusting the bottom in place, and locking them in securely by bending the end of the strip across the top of the box, and forming with it a part of the closing tuck.

2. As an article of manufacture, the box herein described, consisting of a blank cut from a single piece, to form the principal sides B E and A A, and the ends G I, with the auxiliary sides D D, and parts C C, F F, and L H, folded and secured substantially as specified.

EDWARD DE F. SHELTON.

Witnesses:

D. S. BRINSMADE,

THOS. L. CORNELL.